United States Patent [19]
Wilkinson

[11] 4,343,017
[45] Aug. 3, 1982

[54] DECODING COMPOSITE PAL TELEVISION SIGNALS

[75] Inventor: James H. Wilkinson, Tadley near Basingstoke, England

[73] Assignee: Sony Corporation, Tokyo, Japan

[21] Appl. No.: 226,862

[22] Filed: Jan. 21, 1981

[30] Foreign Application Priority Data

Jan. 30, 1980 [GB] United Kingdom ............... 8003084

[51] Int. Cl.³ ........................................... H04N 9/535
[52] U.S. Cl. ..................................... 358/24; 358/31
[58] Field of Search .................................. 358/31, 24

[56] References Cited

U.S. PATENT DOCUMENTS 3,707,596 12/1972 Kuhn ................................. 358/31

OTHER PUBLICATIONS

Auty et al., "Colour Picture Improvement Using Simple Analog Comb Filters", *BBC Engineering*, Dec. 1977, No. 108, pp. 28-33.

*Primary Examiner*—John C. Martin
*Attorney, Agent, or Firm*—Lewis H. Eslinger; Alvin Sinderbrand

[57] ABSTRACT

A composite PAL television signal decoder comprises a first delay device for delaying an input PAL television signal A by one horizontal line scan period minus one quarter of a period of the color sub-carrier signal to produce a first delayed signal B, a second delay device for delaying the signal A by one half of a period of the color sub-carrier signal to produce a second delayed signal C, a third delay device for delaying the signal C by one horizontal line scan period minus one quarter of a period of the color sub-carrier signal to produce a third delayed signal D, means to derive a luminance component Y as one half (A+D), means to derive a chrominance component U as one quarter (B+D) minus one quarter (A+C), and means to derive a chrominance component V as one quarter (C+D) minus one quarter (A+B).

10 Claims, 4 Drawing Figures

FIG. 1A  Y  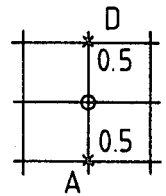
FIG. 1B  U  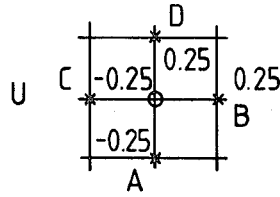
FIG. 1C  V  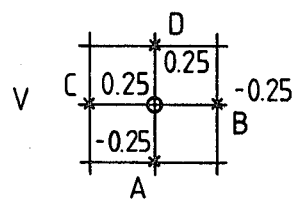
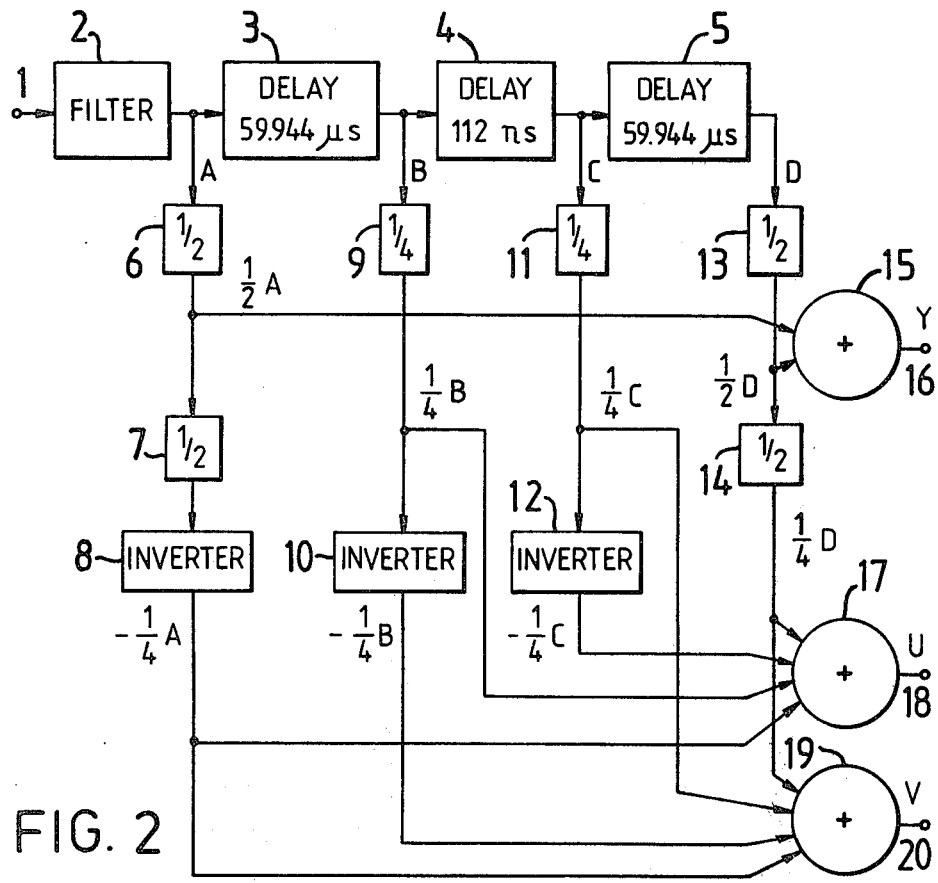
FIG. 2

DECODING COMPOSITE PAL TELEVISION SIGNALS

BACKGROUND OF THE INVENTION

1. Field of the Invention

This invention relates to decoding composite PAL television signals.

2. Description of the Prior Art

The standard method of decoding a composite PAL television signal used in domestic PAL color television receivers makes use of a decoder including a delay device whereby information is derived from two successive horizontal scan lines. This gives a generally acceptable picture, although critical examination, for example of a test card, shows a lack of resolution of fine detail. This defect assumes more importance with moves towards larger screens and towards higher fidelity television reproduction. One reason for the defect is the failure properly to separate the chrominance components U and V from the incoming signal.

SUMMARY OF THE INVENTION

One object of the present invention is to provide an improved method of decoding a composite PAL television signal.

Another object of the present invention is to provide a method of decoding a composite PAL television signal which results in improved separation of the chrominance components U and V from an incoming signal.

Another object of the present invention is to provide apparatus for decoding a composite PAL television signal using delay devices, attenuators, inverters and adders.

According to the present invention there is provided a method of decoding a composite PAL television signal comprising the steps of:

deriving from an input PAL television signal first, second and third delayed signals delayed respectively by one horizontal line scan period minus one quarter of a period of the color sub-carrier signal, one horizontal line scan period plus one quarter of a period of the color sub-carrier and two horizontal line scan periods respectively;

deriving an output luminance component Y as one half of said input signal plus one half of said third delayed signal;

deriving an output chrominance component U as one quarter of said first delayed signal plus one quarter of said third delayed signal minus one quarter of said input signal minus one quarter of said second delayed signal; and deriving an output chrominance component V as one quarter of said second delayed signal plus one quarter of said third delayed signal minus one quarter of said input signal minus one quarter of said first delayed signal.

According to the present invention there is also provided a composite PAL television signal decoder, the decoder comprising:

a first delay device for delaying an input PAL television signal by one horizontal line scan period minus one quarter of a period of the color subcarrier signal to produce a first delayed signal;

a second delay device for delaying said first delayed signal by one half of a period of the color sub-carrier signal to produce a second delayed signal;

a third delay device for delaying said second delayed signal by one horizontal line scan period minus one quarter of a period of the color sub-carrier signal to produce a third delayed signal;

means for deriving a luminance component Y as the sum of one half of said input signal and one half of said third delayed signal;

means to derive a chrominance component U as one quarter of said first delayed signal plus one quarter of said third delayed signal minus one quarter of said input signal minus one quarter of said second delayed signal; and means for deriving a chrominance component V as one quarter of said second delayed signal plus one quarter of said third delayed signal minus one quarter of said input signal minus one quarter of said first delayed signal.

The above, and other objects, features and advantages of this invention will be apparent from the following detailed description in connection with the accompanying drawings.

BRIEF DESCRIPTION OF THE DRAWINGS

FIGS. 1A to 1C show diagrammatically the filter coefficients required in an embodiment of decoder according to the invention;

FIG. 2 shows diagrammatically an embodiment of decoder according to the invention;

DESCRIPTION OF THE PREFERRED EMBODIMENTS

Figure 3:
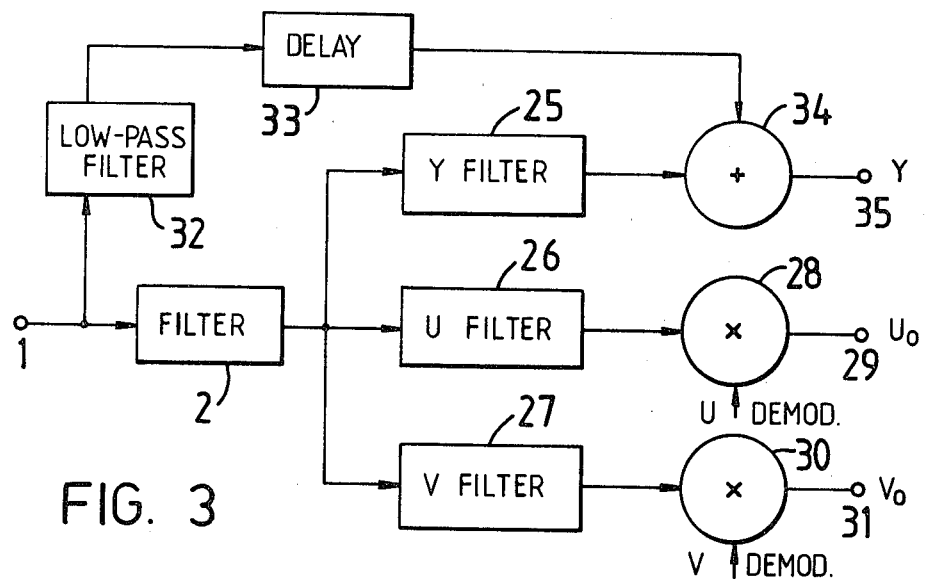
FIG. 3 shows a decoder arrangement including the decoder of FIG. 2 in combination with other parts of a television receiver.

The principle of the invention will first be described with reference to FIGS. 1A to 1C which respectively represent the filter coefficients required for decoding the luminance component Y and chrominance components U and V in an incoming PAL color television signal. In each case the bottom line represents the horizontal scan line currently being received, so it will be appreciated that the three scan lines can be made available by delaying two successive scan lines until the next successive scan line is received.

In each of FIGS. 1A, 1B and 1C the vertical lines represent time in the horizontal scan direction, the centre vertical line being a reference time referred to the bottom horizontal line. The vertical lines to the left and right represent time one quarter of a period of the color sub-carrier signal behind and ahead of the reference time respectively. In terms of time, therefore, the distance between the horizontal lines is 64 microseconds and the distance between the vertical lines is 56 nanoseconds.

The points A, B, C and D represent the signals at various time points on the characteristics. If A is taken to be the signal at a reference time, then D is the signal two horizontal scan lines before, and B and C are the signals one horizontal scan line plus and minus respectively one quarter of the period of the color sub-carrier signal before. Using the signals A, B, C and D, the luminance component Y and the chrominance components U and V can be derived as follows:

Y = one half (A+D)
U = one quarter (B+D) minus one quarter (A+C)
V = one quarter (C+D) minus one quarter (A+B)

The reason why the components Y, U and V can be obtained by the above equations can be explained as follows. The phases of the chrominance components U and V in the third line are inverted compared with those in the first line, because the PAL color sub-carrier signal has a quarter-line-offset. Thus, when the signals A and D are added, the chrominance components U and V are cancelled and only the luminance component Y remains, as indicated by the first equation above. Considering now the chrominance component U, the chrominance components U of the signals B and D have the same relative phase, while the chrominance components U of the signals A and C have the opposite phase. On the other hand, the phase of the chrominance component V in the second line is inverted. Moreover, the chrominance components V of the signals C and D have the same relative phase, while the chrominance components V of the signals A and B each have the opposite phase. So, the chrominance component V is cancelled in each summation (B+D) and (A+C), and subtracting (A+C) from (B+D) leaves only the chrominance component U, as indicated by the second equation above. The derivation of the chrominance component V, as indicated by the third equation above, can be similarly explained.

Turning now to FIG. 2, this shows in block form an embodiment of a decoder for deriving the luminance component Y and the chrominance components U and V in the manner outlined above. The decoder comprises an input terminal 1 which is connected by way of a high-ass filter 2 to the input of a delay device 3. The output of the delay device 3 is connected to the input of a delay device 4, and the output of the delay device 4 is connected to the input of a delay device 5. Each of the delay devices 3, 4 and 5 can be a quartz delay line. The delay devices 3 and 5 are similar and each delays a signal passed therethrough by 59.944 microseconds, that is to say by one horizontal line scan period minus one quarter of the period of the color sub-carrier signal. The delay device 4 delays a signal passed therethrough by 112 nanoseconds, that is to say by one half of the period of the color sub-carrier signal. Thus, the signals A, B, C and D referred to above are available at the outputs of the filter 2 and the delay devices 3, 4 and 5 respectively.

Various circuit arrangements can be provided to perform the necessary operations on these signals A, B, C and D to derive the luminance component Y and the chrominance components U and V, and the arrangement shown in FIG. 2 is given only as an example. The circuit arrangement will generally be formed as an integrated circuit.

In the example shown, the signal A is supplied to a series arrangement comprising a one half attenuator 6, a one half attenuator 7 and an inverter 8. The signal B is supplied to a series arrangement comprising a one quarter attenuator 9 and an inverter 10. The signal C is supplied to a series arrangement comprising a one quarter attenuator 11 and an inverter 12. The signal D is supplied to a series arrangement comprising a one half attenuator 13 and a one half attenuator 14. The outputs of the attenuators 6 and 13 are connected to an adder 15, which derives the luminance component Y by forming one half (A+D), and supplies it to an output terminal 16. The outputs of the inverters 8 and 12 and the attenuators 9 and 14 are connected to an adder 17 which derives the chrominance component U by forming one quarter (B+D) minus one quarter (A+C), and supplies it to an output terminal 18. The outputs of the inverters 8 and 10 and the outputs of the attenuators 11 and 14 are connected to an adder 19 which derives the chrominance component V by forming one quarter (C+D) minus one quarter (A+B), and supplies it to an output terminal 20.

Referring now to FIG. 3, this shows a decoder arrangement incorporating the decoder of FIG. 2, although in this case shown in simplified form, in combination with other parts of a television receiver.

The arrangement of FIG. 3 includes the input terminal 1 to which the input composite PAL television signal is supplied, and the high-pass filter 2 which operates to pass the higher band of the incoming signal, that is to say frequencies in the range 3 MHz to 6 MHz, which includes the chrominance component frequencies as well as higher frequencies of the luminance component. The output of the filter 2 is shown as connected to Y, U and V filters 25, 26 and 27 which derive the luminance component Y and the chrominance components U and V in the manner described with reference to FIG. 2. The output of the U filter 26 is supplied to a U signal demodulator 28 which supplies a demodulated chrominance component $U_o$ to an output terminal 29. The output of the V filter 27 is connected to a V signal demodulator 30 which supplies a demodulated chrominance component $V_o$ to an output terminal 31.

The input terminal 1 is connected by way of a low-pass filter 32 and a delay device 33 to one input of an adder 34, the other input of which receives the output from the Y filter 25. The adder 34 derives the luminance component Y with the low frequencies cut off by the high-pass filter 2 added back, and supplies an output luminance component Y to an output terminal 35. It will be appreciated that the low-pass filter 32 is not essential and moreover that the delay introduced by the delay device 33, if indeed any delay is necessary, will depend on the delays occurring in the alternative signal paths, and in particular in the signal path via the Y filter 25 to the adder 34.

Figure 4A:
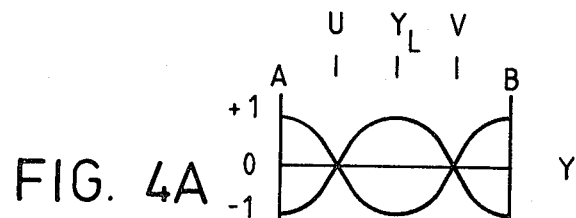
FIGS. 4A to 4C show frequency responses of filters in the embodiment of FIG. 2.
Figure 4B:
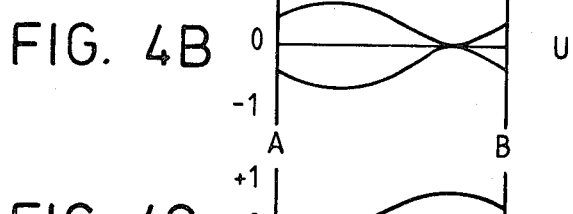
Figure 4C:
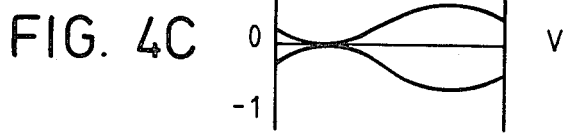

Finally, FIGS. 4A, 4B and 4C respectively show diagrammatically the frequency responses of the Y, U and V filters 25, 26 and 27. These frequency responses are for the chrominance band, as outside this band the U and V responses are of course zero and the Y response is flat. The frequency range of each of the responses shown is 15.625 kHz and these responses are repeated at 15.625 kHz intervals across the chrominance band. In these figures, therefore, $Y_L = n.15.625$ kHz, $U = (n - \frac{1}{4})15.625$ kHz and $V = (n + \frac{1}{4})15.625$ kHz.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of decoding a composite PAL television signal comprising the steps of:

deriving from an input PAL television signal first, second and third delayed signals delayed respectively by one horizontal line scan period minus one quarter of a period of the color sub-carrier signal, one horizontal line scan period plus one quarter of a period of the color sub-carrier and two horizontal line scan periods respectively;

deriving an output luminance component Y as one half of said input signal plus one half of said third delayed signal;

deriving an output chrominance component U as one quarter of said first delayed signal plus one quarter of said third delayed signal minus one quarter of said input signal minus one quarter of said second delayed signal; and deriving an output chrominance component V as one quarter of said second delayed signal plus one quarter of said third delayed signal minus one quarter of said input signal minus one quarter of said first delayed signal.

2. A composite PAL television signal decoder, the decoder comprising:

first delay means for delaying an input PAL television signal by one horizontal line scan period minus one quarter of a period of the color subcarrier signal to produce a first delayed signal;

second delay means for delaying said first delayed signal by one half of a period of the color sub-carrier signal to produce a second delayed signal;

third delay means for delaying said second delayed signal by one horizontal line scan period minus one quarter of a period of the color sub-carrier signal to produce a third delayed signal;

means for deriving a luminance component Y as the sum of one half of said input signal and one half of said third delayed signal;

means to derive a chrominance component U as one quarter of said first delayed signal plus one quarter of said third delayed signal minus one quarter of said input signal minus one quarter of said second delayed signal; and means for deriving a chrominance component V as one quarter of said second delayed signal plus one quarter of said third delayed signal minus one quarter of said input signal minus one quarter of said first delayed signal.

3. A decoder according to claim 2 further comprising filter means arranged in series with said first, second and third delay means, said input signal and said first, second and third delayed signals being derived in use from the outputs of said filter means and said first, second and third delay means, respectively.

4. A decoder according to claim 3 wherein said filter means cuts off frequencies below approximately 3 MHz, said first and third delay means delay signals passing therethrough by 59.944 microseconds and said second delay means delays signals passing therethrough by 112 nanoseconds.

5. A decoder according to claim 2 wherein said luminance component Y and said chrominance components U and V are derived from said input signal and said first, second and third delayed signals by a circuit arrangement comprising attenuators, inverters and adders.

6. A decoder according to claim 5 wherein said circuit arrangement is formed as an integrated circuit.

7. A decoder arrangement comprising a decoder according to claim 2 in combination which U signal demodulator means for receiving said chrominance component U, V signal modulator means for receiving said chrominance component V, adder means for receiving said luminance component Y, and means for supplying to said adder means at least the low frequency components of the composite PAL television signal from which said input signal is derived.

8. An arrangement according to claim 7 wherein said means for supplying includes low-pass filter means supplied with said composite PAL television signal and fourth delay means supplied with the output of said low-pass filter means for supplying at least the low frequency components of said composite PAL television signal to said adder means.

9. An arrangement according to claim 7 wherein said means for supplying includes low-pass filter means for supplying at least the low frequency components of said composite PAL television signal to said adder means.

10. An arrangement according to claim 7 wherein said means for supplying includes fourth delay means for supplying said composite PAL television signal to said adder means.

* * * * *